United States Patent [19]

Zamfirescu

[11] 4,019,392
[45] Apr. 26, 1977

[54] TORQUING SYSTEM FOR STABILIZING INERTIAL PLATFORMS

[75] Inventor: Napoleon Leon Zamfirescu, Torrance, Calif.

[73] Assignee: Northrop Corporation, Los Angeles, Calif.

[22] Filed: Oct. 14, 1975

[21] Appl. No.: 621,965

[52] U.S. Cl. .............................. 74/5 R; 74/5.6 D; 74/5.6 E; 308/9

[51] Int. Cl.² ...................................... G01C 19/28

[58] Field of Search ............. 74/5.6 D, 5.6 E, 5.45, 74/5.46, 5.47, 5 R; 308/9, DIG. 1

[56] References Cited

UNITED STATES PATENTS

| | | | |
|---|---|---|---|
| 2,976,736 | 3/1961 | Cook | 74/5.6 D |
| 3,439,546 | 4/1969 | Baker et al. | 74/5.6 D |
| 3,874,749 | 4/1975 | Maniac | 308/9 |

Primary Examiner—Samuel Scott
Assistant Examiner—F. D. Shoemaker
Attorney, Agent, or Firm—Edward A. Sokolski

[57] ABSTRACT

A spherical inertial platform has a plurality of rotary torquer units spaced around the periphery thereof for torquing the platform relative to its housing in response to stabilization signals thereby to stabilize the platform. The torquer units, which may comprise ball shaped rotors which are torqued in response to stabilizing signals fed to armatures associated therewith, provide a mechanical coupling between the housing and the platform so as to impart the stabilizing torquing forces to such platform; an effective gear ratio being provided between the torquer units and the platform.

5 Claims, 5 Drawing Figures

TORQUING SYSTEM FOR STABILIZING INERTIAL PLATFORMS

This application relates to inertially stabilized platforms, and more particularly to a torquing system for use in stabilizing such platforms.

In U.S. Pat. No. 3,439,546 assigned to Northrop Corporation, the Assignee of the present application, a floated inertial platform is described in which a ball shaped platform is utilized. In this platform, inertial stabilization is achieved by means of magnetic torquing coils mounted on the ball shaped platform which induce eddy currents in the surfaces of the support sphere such that the magnetic fields induced by the eddy currents react with the magnetic field generated by the torquing coil to electrically provide a stabilizing torque to the platform. This type of eddy current torquing effected directly between a platform and a casing is well known in the art.

Where high level torquing is required, it is sometimes difficult with this type of strictly electrical torquing to provide the necessary power. The present invention provides a torquing system having inherently higher torque capabilities than systems of the prior art, this end result being achieved by means of a torque amplifier in the form of an effective gearing system provided by a plurality of small rotor members arranged around the periphery of the platform which are each electrically driven in response to the stabilizing signal to mechanically effect the torquing of the platform.

It is therefore an object of this invention to increase the driving torque for stabilizing an inertial platform.

It is a further object of this invention to provide a torquer system for stabilizing an inertial platform which can satisfy higher torquing power requirements than prior art devices.

It is still another object of this invention to increase the efficiency of operation of the torquing of the inertial platform Other objects of this invention will become apparent as the description proceeds in connection with the accompanying drawings, in which.

Briefly described, the device of the invention is as follows: A spherical inertial platform has a plurality of torquer units arranged around its periphery between the platform and its housing for use in stabilizing the platform. Each torquer unit comprises a spherical rotor member which is eddy current torqued about two mutually orthogonal axes by means of paired armatures to which signals for stabilizing the platform are provided. Torque is mechanically coupled to the platform by virtue of frictional engagement between the rotors and the platform housing and the platform. The torquer unit rotors afford an effective step down gear ratio in their interaction with the spherical platform, thereby effectively providing a step-up of the torque applied to the platform for a given input torque, the small rotors being rotated through a substantially greater angle than the platform for any given input.

Figure 1:
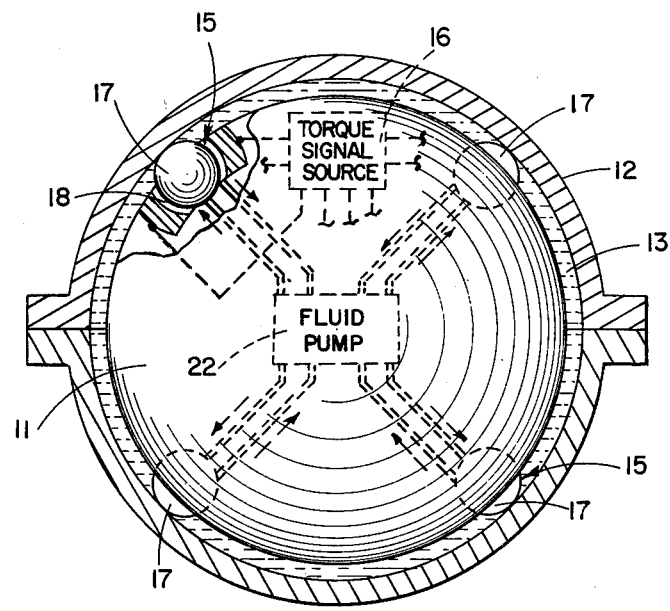
FIG. 1 is a schematic view illustrating a preferred embodiment of the invention.
Figure 2:
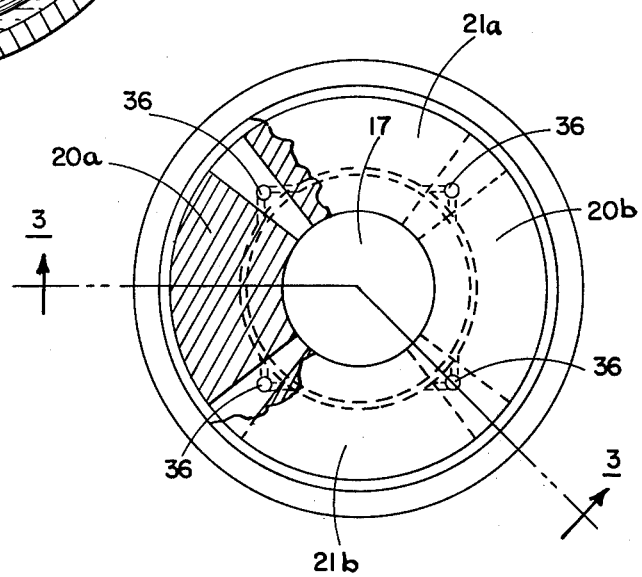
FIG. 2 is a top plan view of one of the torquer units of the preferred embodiment.
Figure 3:
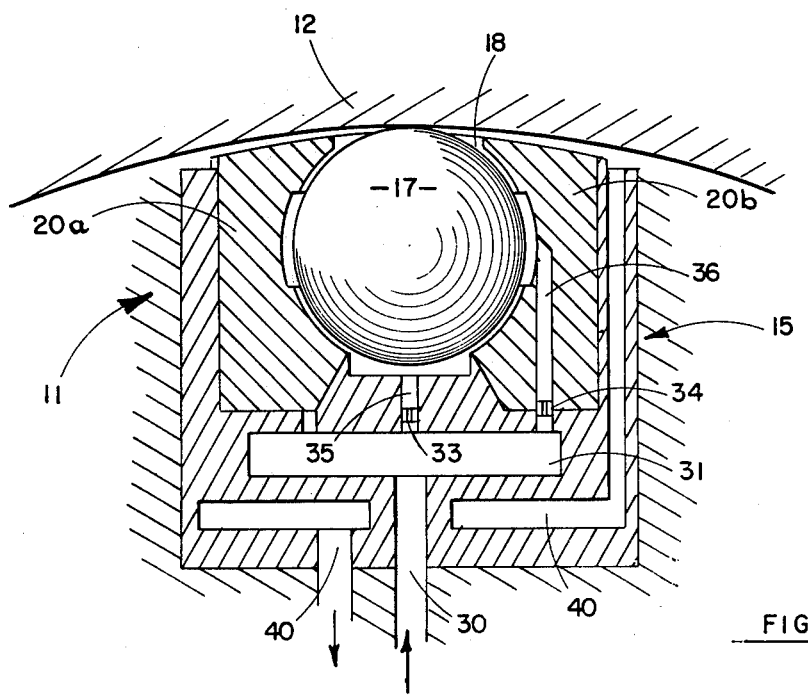
FIG. 3 is a cross sectional view taken along the plane indicated by 3—3 in FIG. 2.

Referring now to FIGS 1, 2 and 3, a preferred embodiment of the invention is illustrated. Spherical platform 11 is supported within casing 12 on a flotation fluid 13, just such as, for example, the device described in the aforementioned U.S. Pat. No. 3,439,546. Platform 11 is inertially stabilized within its housing by means of torquer units 15 which are arranged symmetrically about the periphery of platform 11. Typically, as shown in FIG. 1, there maybe four torquer units 15, although other numbers of such units may be utilized. Each torquer unit comprises a hydrostatically supported ball member 17 which is supported on a fluid bearing 18 formed between the ball 17 and platform member 11. Fixedly supported in platform member 11 are a first pair of stators 20a and 20b arranged on opposite sides of the ball, and a second pair of stators 21a and 21b which are arranged on opposite sides of the ball, the first and second pairs of stators being mutually orthogonal.

A liquid such as Fluorolube is applied to each of the units from fluid pump 22. As can be seen in FIGS. 2 and 3, the liquid is fed to each of the units through fluid inlet channel 30 to chamber 31 from where it is fed through metering orifices 33 and 34 formed in channels 35 and 36 respectively, to the ball surfaces. The liquid is returned to the pump from channel 40 of each torquer unit. The liquid is used both for the support of the ball 17 and for cooling purposes.

Torquing signals for stabilizing platform 11 are supplied for each of the torquer units 15 from torquing signals source 16 contained within platform 11 which may include appropriate pick-offs and amplifier circuits (not shown) to the stators 20a, 20b and 21a, 21b of each such unit, so as to rotate ball members 17 in a manner such as to apply a stabilizing torque to the platform, this by virtue of the frictional drive of the balls against housing 12. For convenience of illustration, the connections from torque signal source 16 to only one of the stator pairs has been shown in FIG. 1. The balls, as already noted, are supported on platform 11 by means of hydrostatic bearings formed by the liquid pumped into the spaces between the balls and the platform, and are coupled to the platform through these bearings. As can readily be seen, the balls operate in conjunction with the platform in the nature of a planetary gear with a speed reduction and torque step-up being achieved between the small ball member 17 and the large spherical platform 11. This torquing system thus has particular advantage where a large amount of torquing force is required but only a small rotational displacement of platform 11.

Ball members 17 are of a highly conductive and magnetic material such as steel, so that both electromagnetic and eddy current torquing can be used in implementing the torquing action. Ball members 17 are light weight and may be made hollow to achieve this objective, such that they are neutrally buoyant in the circulating fluid.

Figure 4:
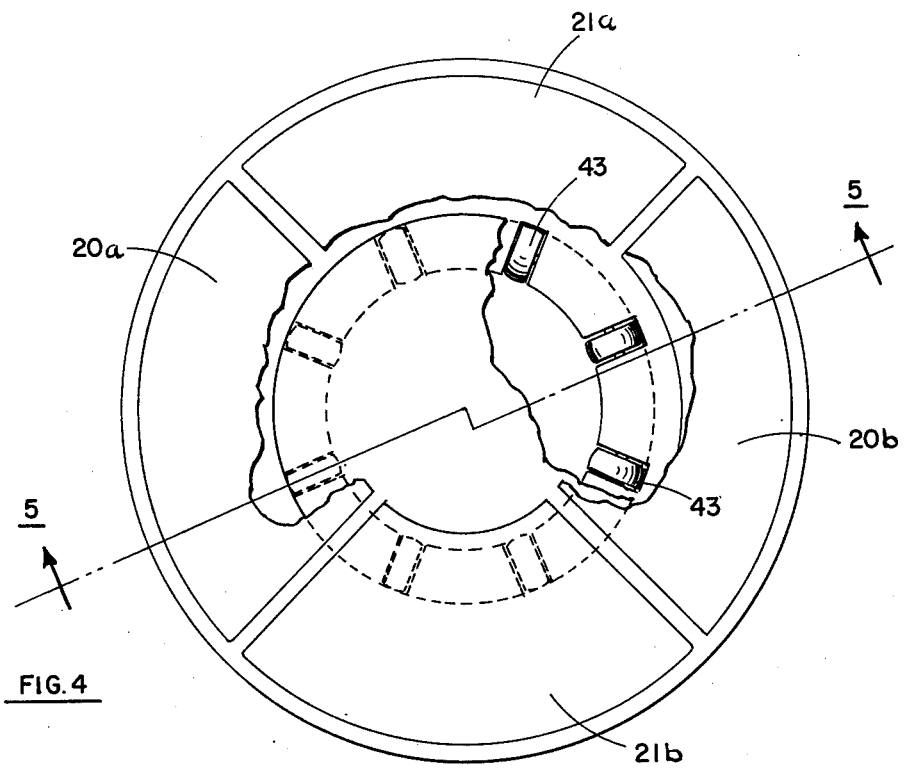
FIG. 4 is a top plan view of a second embodiment of a torquer unit of the invention.
Figure 5:
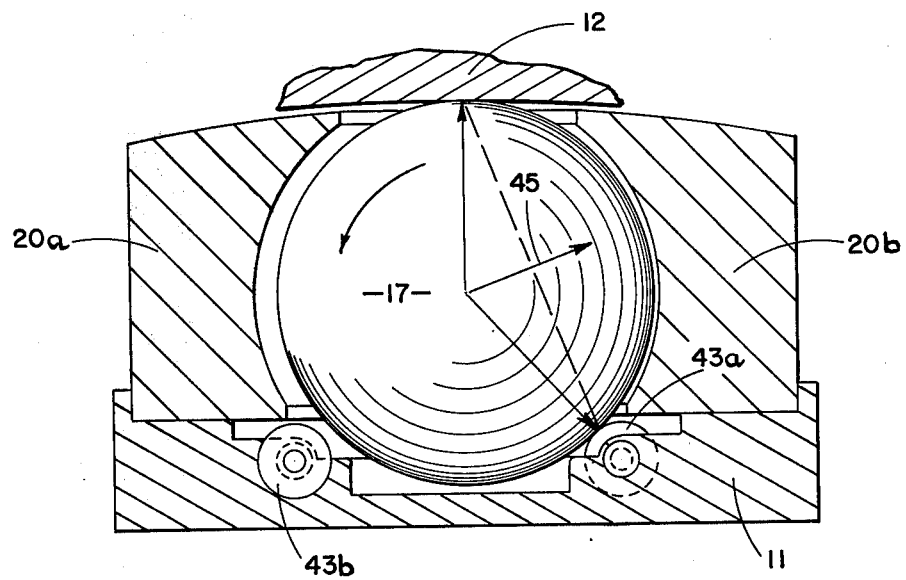
FIG. 5 is a cross sectional view taken along the plane indicated by 5—5 in FIG. 4.

Referring now to FIGS. 4 and 5, a second embodiment of the invention is illustrated. In this second embodiment, there is no fluid bearing support for ball rotors 17. Rotors 17 are supported between housing 12 and spherical platform 11. Platform 11 has a plurality of support casters 43 rotatably mounted thereon on spherical bearings. This provides rotational freedom for the casters, enabling close alignment with the rotation direction of ball member 17. Positioned about ball member 17 are first and second pairs of mutually orthogonal stators 20a and 20b, 21a, 21b. When platform stabilization signals are applied to stators 20a, 20b and 21a, 21b, the ball members are drawn closer to one or the other of the stators, as for example shown in FIG. 5, for a resultant magnetic force as indicated by arrow 45. In this instance, the ball member is caused to abut against the casters 43a which are in the direction of stator 20b, and away from casters 43b which are in the direction of stator 20a. Thus, a torque is applied against these right hand casters 43a, which results in a stabilizing torque being applied to platform 11. Thus, depending upon the signal input to the torquers, the platform will be torqued in one direction or the other.

While the invention has been described and illustrated in detail, it is to be clearly understood that this is intended by way of illustration and example only and is not to be taken by way of limitation, the spirit and scope of this invention being limited only by the terms of the following claims.

I claim:

1. A torquing system for inertially stabilizing a spherical platform in a housing comprising a plurality of torquer units having spherical rotors spaced around the periphery of said platform for mechanically imparting stabilizing torques to said platform, each of said torquer units comprising:
   a ball shaped rotor substantially smaller than said platform mechanically coupling the platform and housing and mounted therebetween,
   first and second pairs of stators positioned adjacent to said rotor in mutually orthogonal relationship, and
   means for providing a torquing signal to said stators in accordance with a platform stabilizing signal to effect magnetic torquing of said rotors, thereby causing said rotors to mechanically torque the platform in response to the stabilizing signals, there being an effective step down gear ratio provided between the rotation of said rotors and the rotation of the platform resulting therefrom.

2. The torquing system of claim 1 and further including liquid bearing means for supporting said rotors between the platform and the housing and means for supplying a flow of liquid to and from said bearing means.

3. The torquing system of claim 1 wherein there are four of said torquer units symmetrically positioned about said platform.

4. The torquing system of claim 1 wherein a plurality of casters are rotatably supported on said platform about said rotor, the rotor being driven against the casters on one or another side thereof in accordance with the stabilizing signals, torque being transferred from the rotors to the platform through the intermediary of the casters engaged thereby.

5. The torquing system of claim 2 wherein the means for supplying liquid to said bearing means comprises a fluid pump, a plurality of channels for supplying fluid from said pump to the various surfaces of said rotor, and means for metering the fluid flow through said channels to equalize the flow to said various surfaces.

* * * * *